ROBERT N. MELLOTT
INVENTOR.

BY Walter J. Adam
ATTORNEY

ROBERT N. MELLOTT
INVENTOR.
BY
Walter J. Adam
ATTORNEY

United States Patent Office 3,364,362
Patented Jan. 16, 1968

3,364,362
MEMORY SELECTION SYSTEM

Robert N. Mellott, Los Angeles, Calif., assignor, by mesne assignments, to The Bunker-Ramo Corporation, Stamford, Conn., a corporation of Delaware Filed Oct. 7, 1963, Ser. No. 314,205
14 Claims. (Cl. 307—88)

ABSTRACT OF THE DISCLOSURE

A selection system suitable for use with a plurality of binary memory elements of the type having a common input-output terminal. The selection system is comprised of a plurality of transistors, the collector of each being coupled to the common terminal of a different memory element. In a write mode, a forward biasing potential is applied to the base of a selected transistor and a binary digit pulse is applied to the emitter of that transistor to thus either apply current to or extract current from the memory element coupled thereto to establish the state thereof. In a read mode, a selected transistor is forward biased and the potential on the transistor emitter is sensed to nondestructively determine the state of the memory element coupled thereto.

Figure 1:
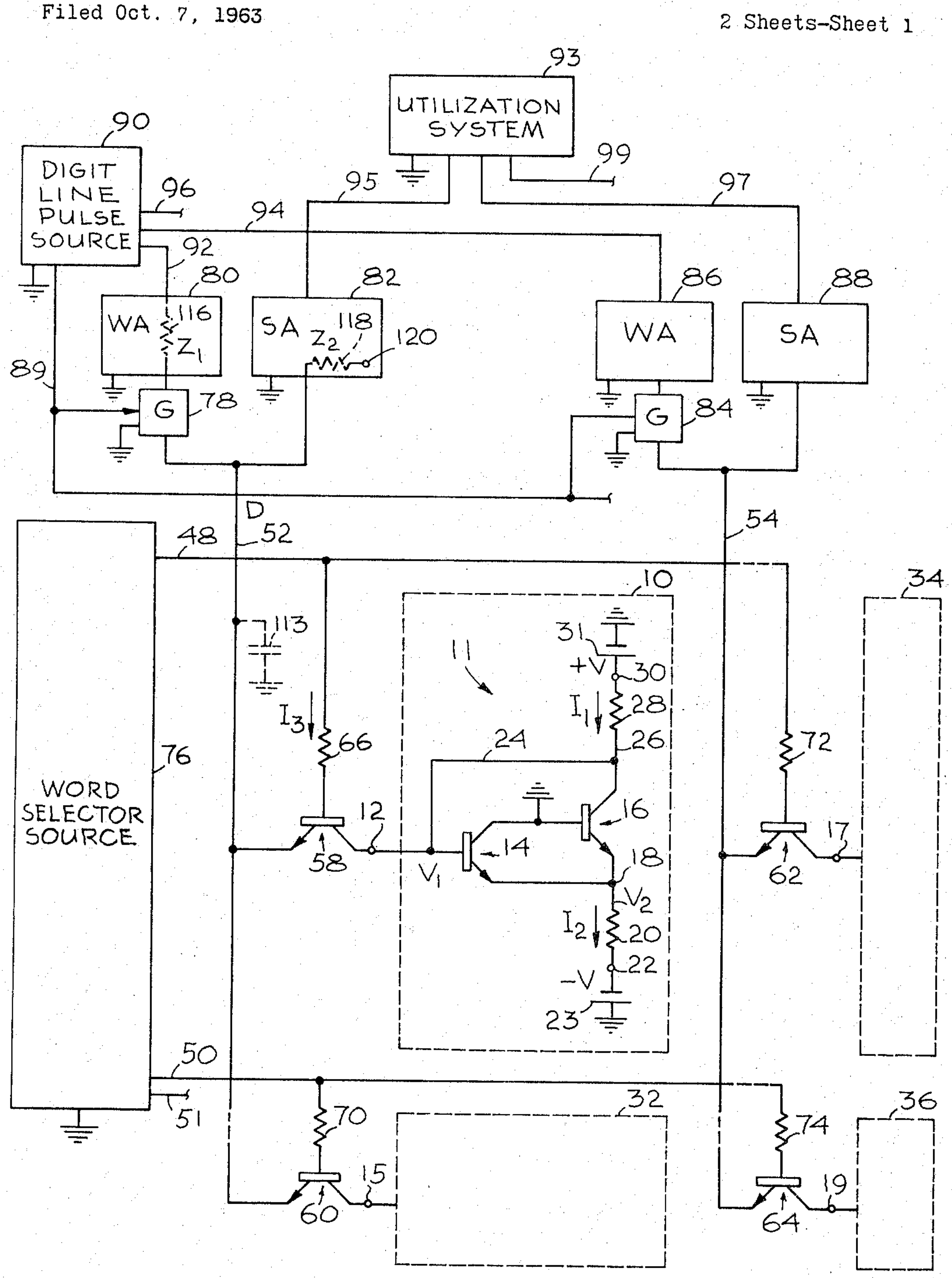

This invention relates to informational storage systems and particularly to simplified and improved circuits and systems for selecting storage elements in a memory system and for entering information into and extracting information from the selected storage elements.

Addressing or selecting of groups of binary storage elements in memory arrays utilizing magnetic storage elements such as cores is conventionally performed during either reading or writing operations or during both operations by coincidently applying signals to selected row and column conductors to be effectively combined at predetermined cores. The groups of binary storage elements may in some memory arrangements each store information representative of a word. During the reading operation, the magnetic elements of an addressed group apply informational signals to associated sense conductors. In memory systems operating at relatively high speeds and utilizing storage elements that are interrogated without changing the stored states, such as conventional flip-flop circuits having separate pairs of input terminals and pairs of output terminals, the selection arrangement which may be of the coincidence type is relatively complicated. During writing, a gating arrangement must be provided at each flip-flop to respond to the coincidence of signals to trigger the flip-flop circuit and during reading a separate gating arrangement must be provided at each flip-flop to allow sensing of the stored state. Also, in memory systems that require a coincidence of signals for operation including flip-flop type memory elements that have a single bidirectional path or common point for both entering and extracting information, a relatively large number of gating elements are conventionally required at each flip-flop circuit to perform the reading and writing functions. Memory systems utilizing flip-flop with separate pairs of input and output terminals and memory systems utilizing flip-flop circuits with common input and output terminals conventionally utilize separate sense conductors or the complexity of the gating circuits is further increased. A selection system that allows the reading and writing operations to be performed on flip-flop type memory elements having a single point for entering and extracting information, by controlling a single active gating element at each memory element, would provide a greatly improved and simplified memory arrangement. Also, a simplified selection system for flip-flop type elements that utilizes one of the sets of coincidence writing conductors for sensing signals during the reading operation so as to eliminate the necessity of separate sense conductors, would be very advantageous in some memory arrangements.

It is therefore an object of this invention to provide a simplified and improved selection arrangement for memory arrays.

It is a further object of this invention to provide a simplified memory selection system for bistable flip-flop elements in which sensed signals are conducted on the informational writing conductors so as to eliminate the requirement of separate sense conductors.

It is another object of this invention to provide a simplified and improved selection gate for an informational storage element.

It is still another object of this invention to provide an improved and simplified selection gate for use with a binary storage element of the type in which information is entered into and extracted therefrom at a single point or terminal.

It is another object of this invention to provide a selection system, operable with a binary storage element, that substantially eliminates the possibility of spurious triggering of the storage element as a result of the presence of distributed capacitance.

It is another object of this invention to provide an improved selection gate and binary storage element circuit combination.

The selection arrangement in accordance with the principles of the invention utilizes a single gating or amplifying device controlled for selectively operating in first and second states to apply bidirectional signals to the terminal of a flip-flop circuit during writing and to operate in a third state to accurately sense bidirectional signals during reading by substantially eliminating voltage drops through the device.

The selection arrangement of the invention is particularly useful in a memory array in which storage elements are utilized that allow information to be entered into or extracted therefrom through a single signal path. However, it is to be understood that the principles of the invention are applicable to other types of storage elements and are not to be limited to any particular type. In a memory array, which may be word organized, for example, a plurality of word select lines are provided with each line addressing all storage elements of a different word group position of storage elements, and a plurality of digit lines are provided for individually controlling each storage element of the addressed or selected word group. A single gating transistor is provided at each storage element with a first load terminal coupled to the signal path of the memory element and a second load terminal coupled to a suitable one of the digit lines. The control electrode or base of each transistor is coupled to a suitable one of the word select lines. During the writing mode of operation, a pulse applied to a selected word line biases the associated transistors into the conductive state. Informational pulses are applied from the digit lines to the second load terminals of each selected transistor to control the associated memory elements. As a result, current either flows from an associated memory element in combination with the base current flowing through the control electrode as the transistor operates in a normal forward-biased state or the base current is applied to the memory element as the transistor operates as a single forward-biased diode, which conditions establish the memory element in a selected binary state. During the reading mode, signals are applied to the word select lines to bias the associated transistors to the conductive states and a voltage representing the stored binary state is applied to each digit line. During this reading mode, the digit lines are controlled so that each of the selected transistors effectively operates as a pair of diodes developing substantially equal voltage drops thereacross. Thus, portions of the base current flow to both the first and second load terminals of the selected transistors so that the voltages sensed on the second load terminal have substantially the same levels as the voltages on the first load terminal. An additional feature in accordance with the principles of this invention is the provision of an arrangement for substantially eliminating the possibility of spurious triggering of the memory element that may result from distributed capacitance appearing on the digit line.

Figure 2:
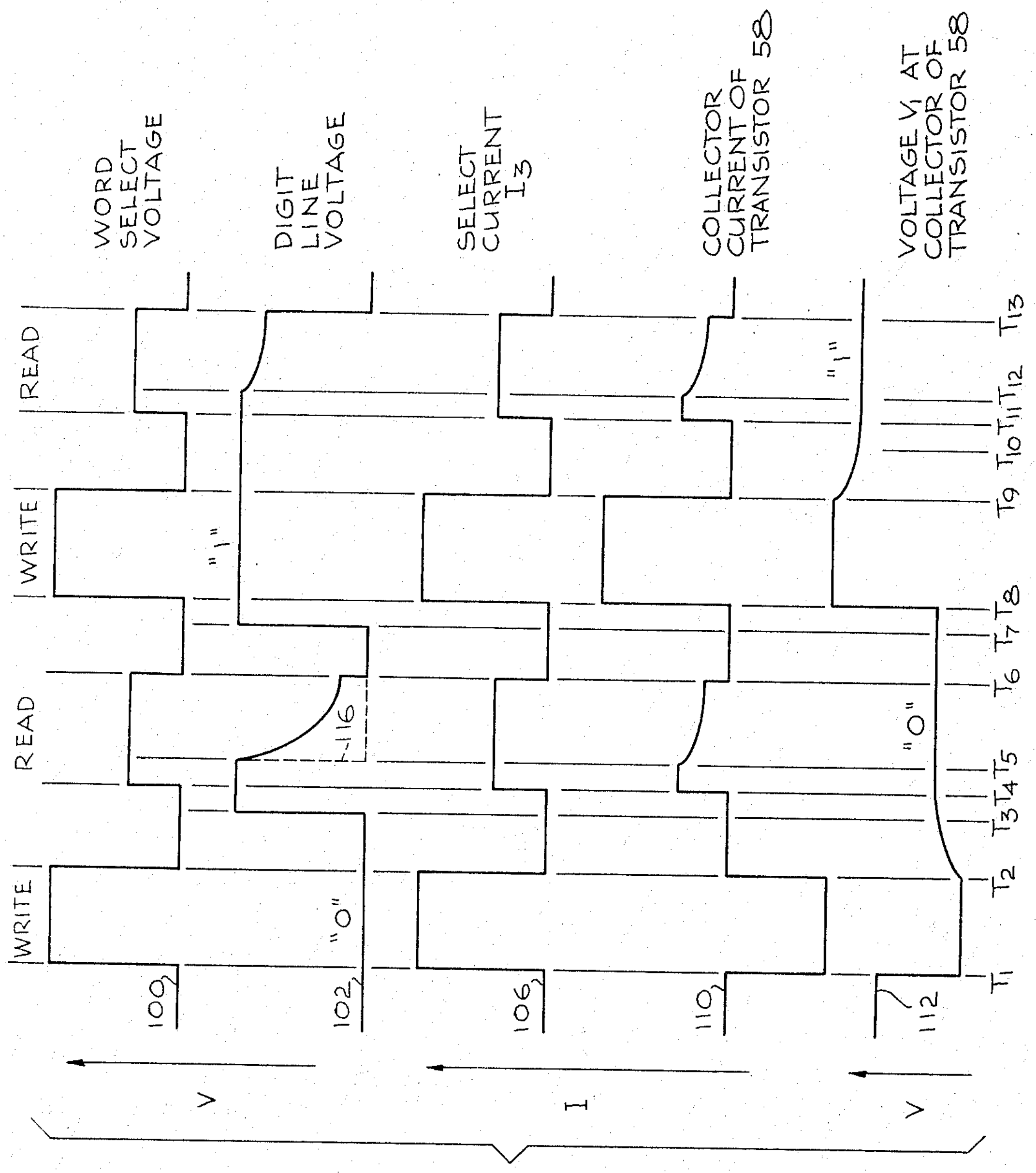

The novel features of this invention, both as to its organization and method of operation, will best be understood from the accompanying description, taken in connection with the accompanying drawings in which:

FIG. 1 is a schematic circuit and block diagram of an arrangement of the selection system and circuits in accordance with the principles of this invention; and FIG. 2 is a schematic diagram showing waveforms of voltage and current as a function of time for further explaining the operation of the selection system and circuits of FIG. 1.

Referring first to the memory selection system of FIG. 1, a word organized memory arrangement in accordance with the principles of this invention is shown for purposes of illustration as including two word groups of binary storage elements, each word group storing two binary bits representing a word. It is to be recognized that the principles in accordance with this invention are applicable to memory arrays of any desired number of word groups of storage elements with each word group of storage elements including any desired number of binary storage elements, as well as being applicable to other types of organization. Also, the gating arrangements of the invention are applicable to the control of single binary storage elements. In the illustrated arrangement, a memory element 10 of a first word group of storage elements includes a flip-flop 11 having the characteristics of allowing information to be entered therein and extracted therefrom at a single terminal 12 and is shown as an example of a type memory element that may be utilized with the circuits and system in accordance with the invention. A memory element 34 is also included in the first word group of storage elements and memory elements 32 and 36 are included in the second word group of storage elements. The memory elements 32, 34 and 36 shown as rectangles for convenience of illustration, have respective terminals 15, 17 and 19 that are similar to the terminal 12.

Although it is to be understood that the particular flip-flop arrangement of the memory element 10 is only illustrative of a type that may be utilized, the organization and operation thereof will be explained for a fuller understanding of the selection system in accordance with the invention. The memory element 10 includes a first transistor 14 and a second transistor 16, both being of the same NPN conductivity type, with the emitters thereof coupled through a lead 18 and a resistor 20 to a suitable source of negative potential such as a terminal 22 indicated as having a voltage $-V$. A battery 23 having a positive terminal coupled to ground may, for example, supply the $-V$ voltage to the terminal 22. The base of the transistor 14 is coupled to the terminal 12 as well as through a lead 24 to a lead 26 which in turn is coupled to the collector of the transistor 16. The lead 26 is also coupled through a resistor 28 to a suitable source of potential 30 indicated as having a voltage $+V$. A battery 31 having a negative terminal coupled to ground may, for example, supply the $+V$ voltage to the terminal 30. The collector of the transistor 14 and the base of the transistor 16 are coupled together and to a suitable common terminal such as ground. In operation, either the transistor 14 or 16 is conductive to provide a voltage $V_1$ at the terminal 12 of respectively a relatively high or a low amplitude representative of the stored binary state.

The selection system also includes a plurality of word select lines such as 48 and 50 and a plurality of digit lines such as 52 and 54 each having a dashed portion to indicate that additional memory elements may be included therein. A word select line 51 is also shown to indicate that additional groups of memory elements may be included in the memory. Each memory element 10, 32, 34 and 36 is controlled by a respective selection or gating transistor 58, 60, 62 and 64, which, for illustrative purposes, may be of the NPN types. The transistor 58 has a base coupled through a resistor 66 to the word line 48, an emitter coupled to the digit line 52 and a collector coupled to the terminal 12. The transistor 60 has a base coupled through a resistor 70 to the word line 50, an emitter coupled to the digit line 52 and a collector coupled to the terminal 15, and the transistor 62 has a base coupled through a resistor 72 to the word line 48, an emitter coupled to the digit line 54 and a collector coupled to the terminal 17. Similarly, the transistor 64 has a base coupled through a resistor 74 to the word line 50, an emitter coupled to the digit line 54 and a collector coupled to the terminal 19. Word select lines 48 and 50 are coupled to a word selector source 76 which may be any conventional pulse-forming source for applying appropriate pulses to selected word lines. The digit line 52 is coupled through a gating circuit 78 to a write amplifier circuit 80 as well as being coupled to a sense amplifier circuit 82. In a similar manner the digit line 54 is coupled through a gating circuit 84 to a write amplifier circuit 86 as well as being coupled to a sense amplifier circuit 88. The write amplifier circuits 80 and 86 have the property of providing a relatively low impedance to the emitters of the gating transistors such as 58 and the sense amplifiers 82 and 88 have the property of presenting a relatively high impedance to the emitters of the gating transistors. Thus, during a reading operation, the gates 78 and 84 are opened in response to appropriate gating signals (not shown) applied thereto from a digit line pulse source 90 through a lead 89.

The digit line pulse source 90 which forms appropriately controlled and timed pulses, as will be explained subsequently, is coupled through a lead 92 to the write amplifier 80 and through a lead 94 to a write amplifier 86. A lead 96 is shown to indicate that other digit lines (not shown) may be controlled therefrom. A utilization system 93 may be coupled to the sense amplifiers 82 and 88 through respective leads 95 and 97 to receive interrogated information therefrom and to apply potentials thereto, as will be explained subsequently. A lead 99 is shown to indicate that the utilization system may receive sensed information from other digit lines (not shown).

The operation of the memory element 10 will now be explained in further detail as an example of the operation of a type of binary storage element that may be utilized with the selection system in accordance with this invention. A requirement for the flip-flop 11 to be bistable is that the collector-to-emitter voltage drop of each of the transistors 14 and 16, when conducting in or substantially in the saturation region is less than the base-to-emitter voltage difference required to forward-bias the other transistor into substantial conduction or to "turn on" the other transistor. To meet this requirement, the flip-flop arrangement may utilize one or both transistors having operating characteristics when conducting in the saturation region, such that the voltage drop from collector-to-emitter is less than the voltage drop from the base to emitter. It is to be noted that both silicon and germanium transistors conventionally have this voltage drop characteristic and the circuit operates with either type transistor or with a combination of both types. For purposes of explanation, it will be assumed that the magnitude of each of the currents $I_1$ and $I_2$ flowing through the respective resistors 28 and 20 remains unchanged whether or not the state of the circuit is such that transistor 14 or alternatively transistor 16 is conducting, although this condition is not necessary for satisfactory operation. Another characteristic of the flip-flop 11 is that the current $I_2$ flowing through the resistor 20 is larger than the current $I_1$ flowing through the resistor 28 by an amount substantially equal to the base current of the transistor 16 when conducting and so that the transistor 16 conducts in or substantially near the saturation region. Also it is desirable for operation of the flip-flop in accordance with this invention that the current $I_1$ is sufficiently large so that the transistor 14 is operating in or substantially near the saturation region when biased in conduction. The values of the respective resistors 28 and 20 and the voltages +V and −V are selected to provide the desired currents $I_1$ and $I_2$ in conjunction with appropriate considerations of the amplification characteristics of the transistors 14 and 16.

When the transistor 14 is conducting in stable operation, a voltage $V_2$ on the lead 18 is established by the collector-to-emitter voltage drop of the transistor 14 and may, for a typical transistor, be −0.1 volt and the voltage $V_1$ may be +0.6 volt assuming a typical base-to-emitter voltage drop of 0.7 volt. Thus, the potential applied between the base and emitter of the transistor 16 as established by the collector-to-emitter voltage drop of the transistor 14 is 0.1 volt and the transistor 16 is maintained in a stable nonconductive state.

When the transistor 16 is conducting in stable operation, the voltage $V_2$ on the lead 18 is established by the base-to-emitter voltage drop of the transistor 16 and may, for example, be −0.7 volt. The voltage $V_1$, such as on the lead 26, is established by the collector-to-emitter voltage drop of the transistor 16 relative to the voltage at the emitter and may be −0.6 volt. Thus, the potential difference applied between the base and emitter of the transistor 14 is 0.1 volt, for example, and that transistor is maintained in a stable nonconductive condition, while the transistor 16 is conducting.

For changing the states of the transistors 14 and 16, a selected voltage is applied to the terminal 12 so that a current therethrough is either supplied to or extracted from the base of transistor 14. When the transistor 14 is conducting in stable operation, base current to that transistor, which is the current $I_1$, is supplied from the terminal 30 through the resistor 28 and the lead 24 to the emitter of the transistor 14 and in turn through the resistor 20 to the negative terminal 22. The current $I_2$ also includes the collector current of the conducting transistor 14. By applying a negative potential to the terminal 12 which causes the current $I_1$ to flow thereto rather than to the base of the transistor 14, conduction is instantaneously stopped through the transistor 14 as the operating point of that transistor changes from the saturation region to the cutoff region. As a result, the voltage on the lead 18 rapidly falls to bias the transistor 16 into conduction in or substantially in the saturation region. With the relatively small collector-to-emitter voltage drop of the transistor 16 thus established between the base and emitter of the transistor 14, this stable state with the transistor 16 conducting is maintained.

When the transistor 16 is conducting in stable operation, the current $I_1$ flows through the collector-to-emitter path of the transistor 16 and in combination with the base current of that transistor flows through the resistor 20 to the −V terminal 22. Applying a selected value of positive voltage to the terminal 12 results in the transistor 14 being biased into conduction. As a result of the increased current applied to the lead 18, the voltage rises at the emitter of the transistor 16 to bias that transistor out of conduction. It is to be noted that depending on the time constants within the flip-flop 11, the load line operating characteristic of the transistor 16 may effectively shift during this triggering action when current flows from the terminal 12 through the transistor 16 so that the operation changes to the active region, resulting in a rise of the collector voltage of that transistor. As a result of the transistor 14 being biased into conduction, the voltage drop established between the collector and emitter of the transistor 14 which may be 0.1 volt is applied across the base and emitter of the transistor 16 to establish and maintain the transistor 16 in a stable nonconductive state in the cutoff region.

It is to be noted that when the transistor 14 is conducting, a subsequent application of a positive signal to the terminal 12 does not change the established binary state of the flip-flop 11 and when the transistor 16 is conducting, a subsequent application of a negative signal to the terminal 12 does not change the established binary state of the flip-flop. Thus, when an existing binary state is desired to be written into the flip-flop 11, the transistors 14 and 16 do not change the conducting and nonconducting states. When the transistor 16 is conducting, the voltage $V_1$ of approximately −0.6 volt, for example, is applied to the terminal 12, which voltage levels may be sensed as representations of the stored binary state.

For further explaining the operation of the selection system and circuits in accordance with the principles of this invention and referring to the waveforms of FIG. 2 as well as to FIG. 1, a word line such as 48 is selected by applying positive signals of a waveform 100 thereto so as to cause the transistors 58 and 62 to become conductive. The voltage applied to unselected word lines such as 50 is sufficiently low or negative as indicated by the lower level of the waveform 100 to maintain the transistors such as 60 and 64 nonconductive. Thus, signals on the digit lines such as 52 and 54 neither influence nor are influenced by unselected memory cells such as 32 and 36. At a time $T_1$, it will be assumed for purpose of illustration, that the transistor 14 is conducting so that the flip-flop 11 is storing a first stable state which may be a binary "1" and that it is desired to write a binary "0" therein with the transistor 16 in the conductive state. As discussed above, with the transistor 14 conducting, the potential $V_1$ at the terminal 12 may be approximately +0.6 volt. In response to the positive pulse of the waveform 100, a current $I_3$ flows through the resistor 66 and through the base-to-emitter path of the selection transistor 58 because of the low level digit line voltage of a waveform 102 applied to the digit line 52. During this write mode of operation the gate 78 is enabled to allow signal passage therethrough and the impedance of the digit line 52 is relatively low as determined by the write amplifier 80 and, depending on the level of the voltage of the waveform 102, current may either flow into the flip-flop circuit 11 or the current $I_1$ may flow therefrom. The gate 78 is enabled prior to time $T_1$ by a suitable timing pulse (not shown) applied on the lead 89. The selected binary voltage of the waveform 102 is applied to the digit line 52 by the write amplifier 80 in response to a signal (not shown) generated by the pulse source 90.

When writing a "0," that is to trigger the transistor 16 into conduction, the current $I_3$ flows from the base to emitter of the transistor 58 in combination with the current $I_1$ flowing from the collector to the emitter, the combined currents at the collector flowing to the digit line 52 and into the write amplifier 80. The voltage level applied to the lead 92 at time $T_1$ representing a "0" to be written into the memory element 10 is lower than that of the voltage $V_1$ applied to the terminal 12. As the transistor 58 conducts the current $I_1$ between the collector and emitter thereof in normal forward-biased operation, the digit line voltage of the waveform 102 is maintained slightly below the voltage $V_1$. Because of the application of the negative voltage $V_1$ of the waveform 112 to the base of the transistor 14, the current $I_1$ flows to the transistor 58 rather than into the base of the transistor 14. The voltage $V_2$ falls in level substantially at the time $T_1$, and the transistor 16 is biased into conduction to maintain the voltage $V_1$ at the low level.

It is to be noted that the transistor 58 may conduct current slightly in excess of the value of $I_1$ between times $T_1$ and $T_2$ because the operating characteristics of the transistor 58 may be selected to provide an overdriving condition to compensate for variations of circuit parameters. The result of this condition is that some current may flow from the base-to-collector junction of the transistor 16 which then operates as a pair of diodes. In this condition, the voltage $V_1$ of a waveform 112 between times $T_1$ and $T_2$ may be substantially the voltage at the emitter of the transistor 16 such as −0.7 volt. At time $T_2$ this base-to-collector current is terminated as the transistor 58 is biased out of conduction in response to the pulse of the waveform 100. The collector-to-emitter current of the transistor 16 thus increases until a time such as time $T_3$ as determined by distributed capacitance in the flip-flop 11, with the 0.1 volt drop thereacross at the time $T_3$ resulting in the voltage $V_1$ of the waveform 112 being −0.6 volt, for example. The magnitude of this slight change in voltage level after time $T_2$ resulting from the transistor 58 having operating characteristics to remove slightly more than the current $I_1$ from the flip-flop 11, varies with changes of circuit parameters such as fluctuations of the power supply voltages, but is not sufficient to affect the reliable operation of the flip-flop 11.

At the time $T_2$, flow of the selection current $I_3$ of the waveform 106 is terminated and current is prevented from flowing from the collector of the transistor 58. At a time $T_3$ the gate 78 may be disabled and a positive voltage of the waveform 102 is applied to the digit line 52. It is to be noted that because of distributed capacitance indicated by a dotted capacitor 113 which may be provided by unselected memory cells such as 32, or by the effects of the conductor configuration, excessive charging current may flow from the terminal 12 at the beginning of the read mode at a time $T_4$. This excessive charging current may disturb the stored binary state by triggering the transistor 16 into conduction when the flip-flop 11 is in a condition storing the "1" state with the transistor 14 conducting. By always applying the positive voltage of the waveform 102 from a suitable source such as the utilization system 93 to selected sense amplifiers such as 82 and to a digit line such as 52, the voltage on the digit line 52 is forced to a value more positive than the voltage $V_1$ by charging the distributed capacitor 113. At time $T_5$ this positive voltage of the waveform 102 is removed as indicated by a dotted trailing edge 116. It is to be noted that in some arrangements, the gate 78 may be maintained enabled between times $T_3$ and $T_5$, and the positive voltage of the waveform 102 may be applied from the write amplifier 80. This sequence of signals initially causes all of the current $I_3$ to flow into the terminal 12 when the read select pulse of the waveform 100 is applied to the base of the transistor 58 such as at a time $T_4$. Thus, in order to prevent undesired triggering of the flip-flop 11 during reading when the transistor 16 is conducting (storing a binary "0"), the voltage of the waveform 100 and current $I_3$ may be reduced during the reading operation from that applied during the writing operation.

At time $T_4$, which may be the start of the read mode of operation, a word line is selected which for purposes of explanation will be the same word line 48 with the memory element 10 storing the binary "0" previously written therein between times $T_1$ and $T_2$ as well as the memory element 34 containing previously written binary information. The word select voltage of the waveform 100 is applied to the bases of the transistors such as 58 and 62 and may be at a lower level than that during the write portion of a cycle so as to reduce the current $I_3$. Between times $T_4$ and $T_5$ and at the time $T_5$ when the potential of the waveform 102 is removed, the entire current $I_3$ is flowing into the terminal 12 which current only decreases as the distributed capacitance of the capacitor 113 starts to discharge.

At time $T_4$, the gate 78 being previously disabled such as at time $T_3$, the emitter of transistor 58 sees the high impedance of the sense amplifier 82. Between times $T_4$ and $T_5$, the total current $I_3$ of the waveform 110 flows into the collector of the transistor 58 in response to the read pulse of the waveform 100, but because the current $I_3$ is reduced during reading, as discussed above, the stable state of the flip-flop 11 is not disturbed. At time $T_5$, as the forcing voltage of the waveform 102 is removed from the digit line 52, the distributed capacitance indicated by the capacitor 113 starts to discharge, as shown by the decrease in level of the voltage of the waveform 102, and an increased portion of the current $I_3$ flows into the digit line 52 between times $T_5$ and $T_6$ as indicated by the decrease of collector current of the waveform 110. It is to be noted that the values of the impedances connected to the digit lines such as 52 are selected relative to the voltage of the waveform 100 and the current $I_3$ so that only a portion such as approximately one-half of the current $I_3$ is able to flow to the emitter of the transistor 58 shortly before a time $T_6$. Thus, between times $T_5$ and $T_6$ the current $I_3$ flows from the base of the transistor 58, which operates similar to a pair of forward-biased diodes, and divides or splits so that portions flow to both the emitter and the collector of the transistor 58.

As is well known in the transistor art, when a relatively large base current is applied to an NPN transistor biased negative relative to the base at both the emitter and collector, the base current divides and flows through both the emitter and collector junctions which are effectively forward-biased diodes. The voltage drops across the two diodes in this condition are substantially equal so that the voltage levels at the collector and emitter are substantially equal. Thus, the transistor 58 effectively provides a short circuit between the collector and the emitter thereof. This operation during reading allows the voltage $V_1$ of the waveform 112 to be sensed on the digit line 52 as the voltage of the waveform 102 at substantially the same level as at the terminal 12, which is highly advantageous when a relatively small binary voltage difference is provided by the storage element such as 10. Between times $T_5$ and $T_6$, preferably substantially close to time $T_6$, the sense amplifier 82 may sample or pass the voltage level of the waveform 112 through strobed circuits (not shown) to the utilization system 93 which may include appropriate portions of a computer, for example.

To further explain the impedance conditions of the digit lines, such as 52, the low impedance of the write amplifier 80 is indicated by a dashed resistor 116 having a relatively small value $Z_1$. Thus, substantially all of the base current $I_3$ flows through the emitter of the transistor 58 when a binary "1" is to be recorded in the flip-flop 11 and normal transistor action is provided. The relatively high impedance of the sense amplifier 82 is indicated by a dashed resistor 118 having a relatively large value $Z_2$, and coupled to a negative voltage terminal 120. Thus, the impedance $Z_2$ and the negative voltage at the terminal 120 are selected so that during a reading operation, only a portion such as approximately one-half of the base current $I_3$ is able to flow through the emitter of a gating transistor such as the transistor 58.

During the write portion of the cycle wherein a binary "1" is to be written into the selected memory elements such as 10, a positive voltage of the waveform 102 is applied to the digit line 52 as at time $T_7$, after enabling the gate 78. At time $T_8$ the write select pulse of the waveform 100 is applied to the selected word line 48 to bias the transistors 58 and 62 into conduction. In the example, the transistor 16 is conducting, representative of the stored "0" state. The emitter collector path of transistor 58 is now a low impedance because of the forward bias on the base and the high emitter voltage is communicated to terminal 12 and the base of transistor 14. Thus, shortly after time $T_8$, the transistor 14 is biased into conduction, the voltage rises at the lead 18 and the transistor 16 is biased out of conduction. The voltage $V_1$ at the base of the conducting transistor 14 is thus maintained after time $T_8$ at the upper level as indicated by the waveform 112 representative of a stored binary "1" state. At time $T_9$ the write select pulse of the waveform 100 is terminated and the transistor 58 as well as the transistor 62 is biased out of conduction.

Because the sum of the current $I_1$ and the current $I_3$ flowing into the terminal 12 from the transistor 58 may be selected to be slightly in excess of the current $I_2$, the combined currents $I_1$ and $I_3$ between times $T_8$ and $T_9$ may be slightly greater than will flow through the base-to-emitter path of the transistor 14. Thus, under these conditions, a portion of the combined currents $I_3$ and $I_1$ will flow through the base-to-collector path of the transistor 14 which then operates as a pair of forward-biased diodes. In this condition the potential on the emitter of the transistor 14 is substantially the same as that on the collector or at ground level and the voltage $V_1$ of the waveform 112 may be maintained at approximately +0.7 volt between times $T_8$ and $T_9$ using the representative values previously discussed. At the completion of the write portion of the cycle when the current $I_3$ is terminated at time $T_9$ in response to the fall of the write pulse of the waveform 100, current flow increases in the collector-to-emitter path of the transistor 14, at a rate determined by distributed capacitance within the flip-flop 11, until approximately 0.1 voltage drop, for example, is developed thereacross at a time such as time $T_{10}$. Thus, the voltage $V_1$ of the waveform 112 is established at +0.6 volt at time $T_{10}$. The magnitude of this slight change in voltage level, when the combined current flowing into the base of the transistor 14 is greater than the current $I_2$, varies with changes of circuit parameters such as fluctuations of the power supply voltages, but is not sufficient to affect the reliable operation of the flip-flop 11.

In a manner similar to that discussed above, a positive voltage which may be at the same level as the previous writing pulse of the waveform 102 may be applied at time $T_{10}$, from the utilization system 93 and the sense amplifier 82 after opening the gate 78, to a selected digit line such as 52 to charge the distributed capacitor 112, which voltage may be maintained until time $T_{12}$, for example. It is to be noted that in some arrangements, in accordance with this invention, the pulse source 90 may provide the upper level voltage signal to the digit line 52 as shown by the waveform 102, to the capacitor 113. At time $T_{11}$ the lower level read pulse of the waveform 100 is applied to a selected word line such as 58 or 50 and the reading operation is performed with the current $I_3$ dividing between the collector and emitter of the transistor 58 a short time after removal, at time $T_{12}$, of the positive voltage on the digit line 52. The voltage of the waveform 102 at substantially the same level as the voltage of the waveform 112 may be strobed before the termination of the read pulse of the waveform 100 which is at a time $T_{13}$. At the same time that information is being written into or read from the memory element 10 a similar operation with selected binary information is performed on the memory element such as 34 controlled by the energized word line. It is to be understood that selection during reading and writing of the memory elements 10 and 32 was for convenience of explanation and that any of a plurality of word lines such as 48 and 50 may be selected for either reading or writing, and during writing any desired combination of binary signals may be applied to digit lines such as 52 and 54.

Although the selection system in accordance with this invention has been explained for entering and extracting information from the flip-flop circuit 11, other current responsive binary elements may be utilized for the memory cells such as 10, 32, 34 and 36. For example, a tunnel diode arrangement may be utilized having a series path including a source of positive potential, a resistor coupled from the source of positive potential to the anode of a tunnel diode with the cathode of the tunnel diode coupled to a source of reference potential or negative potential. The terminal 12 may be coupled to the anode of the tunnel diode so that applying potentials thereto triggers the tunnel diode to either a first or a second stable state as defined by a characteristic load line established by the selected value of the resistor. In this type of arrangement, the stored condition is represented by voltages applied to the terminal 12 similar to those of the flip-flop 11. It is also to be recognized that the gating and selection principles in accordance with this invention may be utilized with memory elements having more than one control terminal.

The arrangements in accordance with this invention have been explained with NPN type transistors. However, it is to be understood that opposite conductivity types may be utilized in accordance with the principles of this invention by appropriate reversals of the polarity relations as are well known in the art.

Although it is to be expressly understood that the values of the various components and voltage levels of the circuit of the present invention may be varied for any desired purpose, the following specifications for the circuit shown in FIG. 1 are included by way of example.

| | | |
|---|---|---|
| Resistor **20** | kilo-ohms | 3.3 |
| Resistor **28** | do | 10 |
| Resistor **66** | do | 3.3 |
| Transistors **14**, **16** and **58** | | 2N744 |
| Word select voltage, waveform **100** for write | volts | +6 |
| Word select voltage, waveform **100** for read | do | +2 |
| Voltage $V_1$ during read | volts | −0.6 or +0.6 |
| Digit line voltage, waveform **102** during write | do | −0.7 or +1.0 |

The digit lines such as 52 during read are connected through an impedance such as $Z_2$ to a voltage source such as the terminal 120 so that approximately 0.3 milliampere of current flows thereto after being raised to a positive voltage at times $T_3$ and $T_{10}$.

Thus, there has been described an improved gating system for selecting memory cells such as those that allow information to be entered therein and extracted therefrom at a single point or terminal. The gating operation is provided by a single active transistor device that controls the reading and writing operations by developing both a normal transistor action and diode actions. The selection system of the invention may provide a simplified gating arrangement without utilizing separate sensing conductors. Also, the selection system in accordance with the invention allows sensing of relatively low level binary voltages by providing gating substantially without changes of the stored voltage levels. Further, the selection system in accordance with the invention provides reliable operation by eliminating the possibility of undesired triggering of the storage elements from the effects of distributed circuit and system capacitance. It will, however, be understood that although in the above description of the present invention and in the claims appended hereto specific reference has been made to devices presently known in the art as transistors, it is contemplated that various devices differing in structure from transistors per se may be used in the practice of the present invention insofar as they may be adapted to exhibit characteristics substantially corresponding to the transistor devices disclosed herein.

The embodiments of the invention in which an exclusive property or privilege is claimed are defined as follows:

1. A gating device for controlling reading and writing in a memory comprising a transistor having an emitter, a collector and a base, a storage element having a terminal coupled to the collector of said transistor, a controllable source of signals coupled between said storage element and the base of said transistor for selectively applying voltage signals to said base during reading and writing, and controllable means coupled between said storage element and the emitter of said transistor for applying voltage pulses to said emitter through a relatively low impedance during writing and for providing a relatively high impedance to current flow from the emitter of said transistor during reading.

2. A selection device for writing information into and reading information from a memory element comprising a transistor having an emitter, a collector and a base, a bistable memory element having a common input and output terminal coupled to the collector of said transistor, a source of selection pulses coupled to the base of said transistor for applying base current thereto during reading and writing, a source of digit pulses coupled to the emitter of said transistor for applying selected information pulses thereto during writing, and sensing means coupled to the emitter of said transistor for providing a selected impedance during reading so that portions of the base current flow through the collector and emitter of said transistor.

3. A device for selecting a storage element during reading and writing comprising a transistor having a control terminal and first and second load terminals, a bistable memory element having a common input and output control point coupled to the first load terminal of said transistor, a source of first and second selection pulses coupled to the control terminal of said transistor for respectively applying a first selection current therethrough during reading and a second selection current therethrough during writing, a source of digit pulses coupled to the second load terminal of said transistor for applying selected information pulses thereto during writing so that the first selection current flows through the first load terminal or the first selection current and a current from the control point of said memory element flows through said second load terminal, and sensing means coupled to the second load terminal of said transistor for providing a selected impedance during reading so that portions of the second selection current flow through said first and second load terminals.

4. A gating device comprising a transistor having an emitter, a collector and a base, a binary memory element having a terminal coupled to the collector of said transistor, said memory element being selectively triggered during writing to first or second binary states in response to selected first and second potentials applied to said terminal so that currents respectively flow to said terminal and into said memory element or flow from said memory element to said terminal, said memory element applying potentials to said terminal representative of stored binary states, a source of base current coupled to the base of said transistor for applying currents thereto during reading and writing, and means coupled to the emitter of said transistor for applying selected potentials thereto during writing so that the base current either flows to said terminal or the base current in combination with current from said terminal flows to the emitter of said transistor, and for providing a potential and an impedance during reading so that portions of the base current flow through both the emitter and the collector of said transistor so that the potentials at said terminal are applied to the emitter of said transistor at substantially the same levels.

5. A memory writing and reading gate comprising a transistor having an emitter, a collector and a base, a storage element having a common input and output terminal coupled to the collector of said transistor, a source of read and write pulses coupled between the base of said transistor and said storage element, a source of digit pulses having selected first and second potential levels coupled between the emitter of said transistor and said storage element, sensing means coupled between the emitter of said transistor and said storage element and providing a relatively high impedance to current flow from the emitter of said transistor, said transistor responding to a write pulse and to a digit pulse of a first or a second level to pass current between the base and emitter thereof and apply a positive potential to said terminal or to pass current between the collector and emitter thereof and apply a negative potential to said terminal, and said transistor responding to a read pulse to pass current from the base to both the collector and emitter thereof with potentials at said collector being applied to said emitter at substantially the same potential levels.

6. A system for gating a binary storage element having a terminal and being triggered to a selected state in response to signals selectively applied thereto so that current flows into or from said terminal, said storage element applying voltages to the terminal representative of the stored binary state comprising a transistor having a collector coupled to the terminal of the storage element and having an emitter and a base, a first source of pulses coupled to the base of said transistor for selectively applying writing and reading pulses thereto, a second source of pulses coupled to the emitter of said transistor for providing during writing a substantially low impedance thereto and applying pulses of selected polarities so that either current from the base of said transistor and current from the collector flow into the emitter of said transistor or the base current flows into the collector of said transistor to trigger said storage element to selected states, and means coupled to the emitter of said transistor for providing during reading a substantially high impedance to current flow from the emitter of said transistor so that portions of the base current flow through the collector and emitter of said transistor and the voltage at the terminal of said storage element is applied to the emitter of said transistor at substantially the same voltage level.

7. A circuit for controlling a reading and writing operation comprising a binary memory element coupled to a terminal and triggering to a first or a second stable state in response to a first or a second voltage applied to said terminal, said memory element applying said first and second voltages to said terminal when respectively in said first and second states, a transistor having a collector coupled to said terminal and having an emitter and a base, a source of voltage coupled to the base of said transistor for applying a first base current thereto during writing into said memory element and a second base current thereto during reading from said memory element, said first base current having a substantially larger value than said second base current, and a control source coupled to the emitter of said transistor for selectively applying thereto, during writing, a first voltage for steering said first base current into the collector of said transistor and a second voltage for steering said first base current and a current from said memory element into the emitter of said transistor, and for providing, during reading, a relatively high impedance whereby portions of said second base current flow into the emitter and collector of said transistor.

8. In combination with a memory element capable of being triggered to first and second binary states in response to respective first and second potentials applied to a terminal thereof, said memory element developing different first and second voltages at said terminal corresponding to said first and second states, a selection circuit comprising:

a transistor having a base, an emitter and a collector with the collector coupled to the terminal of said memory element, connecting means coupled to the emitter of said transistor and having capacitive means coupled thereto, a source of potential signals coupled to said connecting means for supplying a first base current during writing and a second smaller base current during reading, a writing source coupled to said connecting means for selectively applying a first or a second informational potential thereto during writing, said first informational potential having a higher level than said second informational potential to respectively bias said transistor so that said first base current flows to the collector of said transistor or said first base current and current from the collector of said transistor flows to the emitter thereof, reading means coupled to said connecting means for providing during reading an impedance so that portions of said second base current flow through the emitter of said transistor and the first or second voltages at said terminal are applied at substantially the same respective voltage levels to the emitter of said transistor, and charging means coupled to said connecting means for applying a potential to the emitter of said transistor prior to reading to charge said capacitive means.

9. In combination with a binary element having first and second stable states for applying respective first and second voltage to a terminal thereof, said element being triggered to said first and second stable states respectively in response to the application of current to said terminal or removal of current therefrom, a selection circuit comprising a transistor having a base and an emitter and having a collector coupled to the terminal of the binary element, impedance means having a first end coupled to the base of said transistor, a source of read and write selection pulses;

a source of first and second digit pulses;

sensing means coupled to the emitter of said transistor, and control means for applying a write selection pulse to the base of said transistor during writing and for selectively applying a digit pulse to the emitter of said transistor so as to selectively apply base current to said binary element or remove current therefrom, and for applying during reading, a read selection pulse to the base of said transistor, said sensing means providing an impedance to the emitter of said transistor so that the base current flows to both the emitter and collector of said transistor.

10. In combination with a memory element capable of being triggered to first and second binary states in response to respective first and second potentials applied to a terminal thereof, said memory element developing different first and second voltages at said terminal corresponding to said first and second states, a selection circuit comprising:

a transistor having a base, an emitter and a collector with the collector coupled to the terminal of said memory element, a source of signals coupled to the base of said transistor for supplying a first base current during writing and supplying a second smaller base current during reading, a writing source coupled to the emitter of said transistor for selectively applying a first or a second informational potential thereto during writing, said first informational potential having a higher level than said second informational potential to respectively bias said transistor so that said first base current flows to the collector of said transistor or said first base current and current from the collector of said transistor flows to the emitter thereof, and reading means coupled to the emitter of said transistor for applying a potential substantially equal to said first informational potential to the emitter of said transistor prior to reading and for providing during reading an impedance so that portions of said second base current flow through the collector and through the emitter of said transistor and the first or second voltages at said terminal are applied at substantially the same respective voltage levels to the emitter of said transistor.

11. In combination with a memory element capable of being triggered to first and second binary states in response to respective first and second potentials applied to a terminal thereof, said memory element developing different first and second voltages at said terminal corresponding to said first and second states, a selection circuit comprising:

a transistor having a base, an emitter and a collector with the collector coupled to the terminal of said memory element, a source of current coupled to the base of said transistor for applying a first base current during writing and a second smaller base current during reading, gating means coupled to the emitter of said transistor, a source of first and second potentials coupled to said gating means with the first potential having a higher level than said second potential, said first and second potentials being selectively applied to the emitter during writing to respectively bias said transistor so that said first base current flows to the collector of said transistor or to bias said emitter so that said first base current and current from the collector of said transistor flow to the emitter thereof, and a source of selected impedance coupled to the emitter of said transistor for limiting the current at the emitter during reading so that portions of the second base curent flow to both the emitter and collector of said transistor and the first or second voltages at said terminal are applied to the emitter of said transistor at substantially the same respective voltage levels.

12. A selection system comprising a plurality of binary elements each having a terminal responsive to a signal for changing beween first and second stable states and for applying first and second voltages to said terminal representative of said first and second states, a plurality of word conductors, a plurality of digit conductors, a plurality of transistors each having a base, an emitter, and a collector, the base of each transistor coupled to a selected word conductor, the collector of each transistor coupled to the terminal of a different one of said binary elements, the emitter of each transistor coupled to a selected digit conductor, a source of selection pulses coupled to said word conductors, a source of writing pulses coupled to said digit conductors, and sensing means coupled to said digit conductors.

13. A memory system comprising a plurality of groups of memory elements, a plurality of transistors each having a collector coupled to an associated one of said plurality of memory elements, each transistor having an emitter and a base, a plurality of first lines each coupled to the bases of the transistors associated with a different group of memory elements, a plurality of second lines each coupled to the emitter of a different transistor associated with each of said groups of memory elements, a first source of pulses coupled to said plurality of first lines for selectively applying selection pulses thereto, a second source of pulses coupled to said plurality of second lines for selectively applying informational pulses thereto, and sensing means coupled to said plurality of second lines.

14. A circuit for storing information and interrogating stored information comprising first and second sources of potential each having first and second ends, first, second and third transistors each having a base, an emitter and a collector, a first resistor coupled from the first end of said first source of potential to the collector of said first transistor and the base of said second transistor, a second resistor coupled from the emitters of said first and second transistors to the first end of said second source of potential, connecting means coupling the base of said first transistor and the collector of said second transistor to the second ends of said first and second sources of potential, means coupling the base of said second transistor to the collector of said third transistor, a first selectable source of potential coupled from said connecting means to the base of said third transistor for supplying base currents thereto during storing of information and interrogating of stored information, a second selectable source of potential coupled from said connecting means to the emitter of said third transistor for controlling said third transistor during storing of information to selectively bias either the first or the second transistor into conduction and pass current from said first selectable source of potential to the collector of said first transistor or to pass current from the base of said second transistor to the emitter of said third transistor, said first or second transistors when conducting applying first or second informational voltages to the collector of said third transistor, and sensing means coupled to the emitter of said third transistor for providing an impedance during interrogating of stored information so that portions of the current from said first selectable source of potential flows through both the emitter and collector of said third transistor and the first or second informational voltages at the collector thereof is applied to the emitter thereof at substantially the same voltage level.

References Cited

UNITED STATES PATENTS

| | | | |
|---|---|---|---|
| 2,825,889 | 3/1958 | Henle | 340—173 |
| 2,939,119 | 5/1960 | Einsele | 340—174 |

TERRELL W. FEARS, *Primary Examiner.*